United States Patent [19]

Ramsden

[11] Patent Number: 4,540,486

[45] Date of Patent: Sep. 10, 1985

[54] POLYETHYLENIMINE BOUND CHROMATOGRAPHIC PACKING

[75] Inventor: Hugh E. Ramsden, Scotch Plains, N.J.

[73] Assignee: J. T. Baker Chemical Company, Phillipsburg, N.J.

[21] Appl. No.: 555,368

[22] Filed: Nov. 25, 1983

[51] Int. Cl.³ .............................................. B01D 15/08
[52] U.S. Cl. .................................. 210/198.2; 210/502; 502/402; 502/407
[58] Field of Search ...................... 210/656, 198.2, 502; 55/67, 386; 502/402, 407

[56] References Cited

U.S. PATENT DOCUMENTS

| | | | |
|---|---|---|---|
| 3,722,181 | 3/1973 | Kirkland et al. | 210/656 |
| 4,212,905 | 7/1980 | Tsibris | 210/656 |
| 4,245,005 | 1/1981 | Regnier | 55/67 X |
| 4,290,892 | 9/1981 | Abbott | 210/656 |
| 4,431,544 | 2/1984 | Atkinson et al. | 210/656 |

*Primary Examiner*—John Adee
*Attorney, Agent, or Firm*—George W. Rauchfuss, Jr.; Salvatore R. Conte

[57] ABSTRACT

The reaction product of silica gel or controlled pore glass and polyethyleniminopropyl trimethoxy silane suitable for use as chromatographic column packing.

11 Claims, No Drawings

POLYETHYLENIMINE BOUND CHROMATOGRAPHIC PACKING

BRIEF DESCRIPTION OF INVENTION

In accordance with the present invention, particulate silica gel having an average particle diameter of from about 3 to about 70 microns and an average pore size of from about 50 to about 1000 Angstrom units is reacted with polyethyleniminopropyl trimethoxy silane (PEIPr-triMeO-silane) having an average molecular weight of from about 400 to about 1800. The reaction product, non-crosslinked covalently bonded polyethyleniminopropylsilyl-silica gel (PEI-PrSi-silica gel), is useful as column packing in liquid chromatography for the purification and separation of anions, serving as ion exchange media. For high-performance liquid chromatographic (HPLC) application, the PEI-PrSi-silica gel is useful in the separation and analysis of protein mixtures.

The subject PEI-PrSi-silica gel may also be converted into a carboxylated form suitable for the purification and separation of cationic proteins.

Similarly useful products are also obtained from the initial interaction of particulate controlled pore glass having an average particle diameter of from about 37 to 177 microns and an average pore size of from about 40 to about 1000 Angstrom units with the PEIPr-triMeO-silane.

PRIOR ART

Alpert and Regnier in J. Chromatogr. 185, 375–392 (1979) have shown that polyethylene imine (PEI) may be adsorbed to silica surfaces, thereby providing sufficient primary and secondary imino groups on adjacent adsorbed PEI molecules to be crosslinked by multifunctional oxiranes into a polymeric layer. Recently, the separation of synthetic oligonucleotides using high-performance liquid chromatography (HPLC) with columns of microparticulate silica coated with crosslinked polyethylene imine has been reported in the literature by T. G. Lawson et al., Anal. Biochem. 133, 85–93 (1983). In contrast, the present invention provides a porous silica or glass support to which a non-crosslinked polyethyleniminopropyl silane is covalently bonded, rather than being adsorbed thereon.

DETAILED DESCRIPTION OF INVENTION

The non-crosslinked covalently bound PEI silica gel and glass products of the present invention are conveniently prepared in accordance with the following steps:

A. reacting either particulate silica gel having an average particle diameter of from about 3 to about 70 microns and an average pore size of from about 50 to about 1000 Angstrom units, or particulate controlled pore glass having an average particle diameter of from about 37 to 177 microns and an average pore size of from about 40 to about 1000 Angstroms, in an inert organic solvent slurry with a lower alkanolic solution of polyethyleniminopropyl trimethoxy silane having an average molecular weight of from about 400 to about 1800, said reaction being conducted at ambient to refluxing temperature for about 2 to about 50 hours;

B. recovering the resultant solid fraction from the reaction mixture; and

C. heating said solid fraction at a temperature and for a time sufficient to dry and completely bond the silane to the respective silica gel or controlled pore glass.

As used herein, the term "covalently bound" or "covalently bonded" means that the PEI moieties are covalently attached to the silica gel or controlled pore glass by way of chemical interaction resulting in a propylsilyl (Pr-Si) linkage; and the term "non-crosslinked" means that the imino and amino groups on adjacent covalently bound PEI moieties are not crosslinked, or reacted with a crosslinking agent, to form a polymeric layer.

Without being bound thereby, it is believed that the reaction proceeds to completion in two steps as follows:

Step 1: Silica hydroxyls and the methoxy groups on the silane react to form Si-O-Si bonds and free methanol, with some residual methoxy groups remaining unreacted:

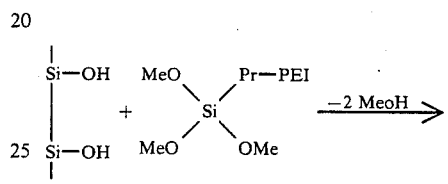

Step 2: Completion of the reaction with the residual methoxy groups is effected during heat curing by (a) and (b):

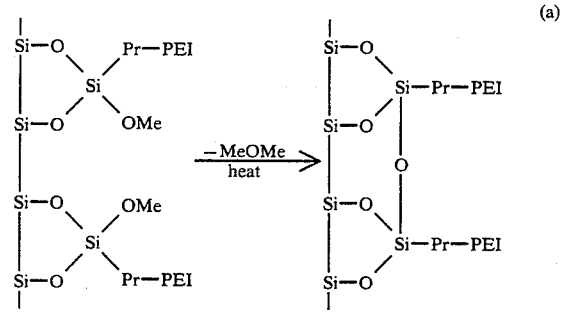

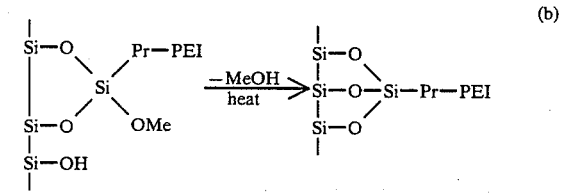

Silica gel, consisting of amorphous silica, is commercially available in irregular and spherical (preferred) particulate forms and in several commercial grades with mesh sizes ranging from 3 through 325 (ASTM). Rather than relying upon a numerical indication of mesh size, however, more accurate indicia for purposes of this invention are the average diameter and average pore size of the silica gel particles, respectively, from about 3 to about 70 microns and from about 50 to about 1000, preferably 250–500, Angstrom units. For end product use in packing HPLC chromatographic columns, a silica gel starting material of from about 3 to about 10 microns is preferred, and, for packing low pressure chromatographic columns, from about 40 to about 70 microns is preferred.

Controlled pore glass (CPG), which is a silicate containing support material chemically similar to silica for use in liquid chromatography, is commercially available, for example, from the Pierce Chemical Co., Rockford, Ill., with average particle diameter of 37–177 microns and average pore size of 40–1000 Angstroms, preferably 40–500 Angstroms.

Among the inert organic solvents suitable for preparing the silica gel or CPG slurry are aliphatic hydrocarbons such as, for example, hexane, heptane and the like; aromatic hydrocarbons such as, for example, benzene, toluene, xylene and the like; lower alkanols such as, for example, ethanol, isopropanol, butanol and the like; chlorinated methanes such as, for example, methylene chloride, chloroform, carbon tetrachloride and the like (Caution: such chloro solvents may react at higher temperatures!); and such other inert solvents as tetrahydrofuran, glyme, diglyme and the like. In general a 1:5 ratio of silica gel or CPG in grams to solvent in milliliters affords a suitable slurry. Due to the fine, insoluble nature of the particulate silica gel and CPG, a slurry rather than a true solution is obtained.

Polyethyleniminopropyl trimethoxy silane, also known as (N-trimethoxysilylpropyl)-polyethylenimine, is the reaction product of polyethylenimine and aminopropyltrimethoxy silane and can be represented by the following formula:

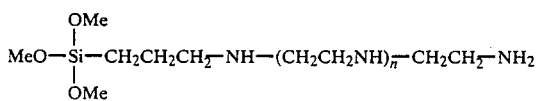

(I)

wherein, for purposes of this invention, n is an integer from about 4 to about 37, or, if expressed in terms of average molecular weight, from about 400 to about 1800.

The silane (I) is used in the reaction with the silica gel or CPG in the form of a lower $C_1$–$C_6$ alkanolic solution using sufficient alkanol to solubilize the silane. A fifty percent w/w isopropanolic solution is preferred. In general, about 25–100 grams of the silane, or, alternatively, about 50–200 ml of a fifty percent w/w alkanolic solution of the silane, is used to react with each 100 grams silica gel or CPG. The reaction may be conducted at ambient temperature although elevated temperatures up to the refluxing temperature of the reaction solvent system may be utilized to enhance the rate of reaction. The reaction proceeds readily to substantial completion (Step 1) within 2–50 hours. Stirring during admixture of the reactants is advantageously employed although the reaction thereafter may continue without further stirring. Anhydrous conditions are not critical, it having been found that the presence of a small amount of water, for example, about 0.1–1.0 ml per 50 ml of the slurry solvent, does not adversely affect the reaction.

The resultant solid fraction is recovered from the reaction mixture by conventional physical means, for example, filtration, centrifugation, etc. In general, a filtering means sufficient to retain a particle size of 5 microns is suitable whereas centrifuging is suitable for a particle size of 3 microns.

The recovered solid fraction is then heat cured at a temperature and for a time sufficient to dry and completely bond the silane to the silica gel or CPG covalently. In general, from about 1–4 hours at about 40°–120° C. has been found sufficient. The thus-obtained covalently bound, non-crosslinked final product preferably contains from about 0.5 to about 3.8 percent nitrogen.

The thus-obtained weakly basic PEI-PrSi-silica gel or PEI-PrSi-CPG products may be converted to a weakly acidic carboxylated form by conventional treatment, for example, see S. Gupta et al., Anal. Biochem. 128, 196–201 (1983), with an appropriate dibasic acid anhydride in an inert organic solvent. Typical such anhydrides include, for example, succinic acid anhydride, glutaric acid anhydride, diglycolic acid anhydride and the like. Sufficient anhydride is used to react with substantially all of the imino and amino functions on the PEI moiety. The number of carboxylic groups in the resultant succinoylated product, for example, may be determined by standard titration against suitable alkali. For purposes of this invention, a carboxyl milliequivalent per gram of final product from about 0.3 to about 1.2 is preferred.

Accordingly, this invention provides a non-crosslinked polyethyleneimine (PEI) function covalently bound to silica gel or controlled pore glass by way of a propylsilyl (Pr-Si) linkage. The subject PEI-PrSi-silica gel or PEI-PrSi-CPG products constitute new and useful bonded phases for the purification and separation of anionic and, in the carboxylated form, cationic materials, e.g. proteins oligonucleotides and other charged molecules by column chromatography and are particularly suitable with modern HPLC instrumentation. The packing may be of various mesh sizes, for example, from about 50 to about 600 mesh. An example of the methodology suitable for separations operable herein is the same as previously reported in the literature for the adsorbed crosslinked PEI-silica type of stationary phases, for example, the separation of synthetic oligonucleotides as shown by T. G. Lawson et al., ibid.

EXAMPLE 1

A. To a slurry of 10 grams silica gel with average particle diameter of 40 microns and average pore size of 60 Angstroms, commercially available from J. T. Baker Chemical Co., Phillipsburg, N.J., in irregular form as "Silica Gel #7024", in 50 ml toluene is added with stirring 19.71 grams of a 50% w/w isopropanolic solution of polyethyleniminopropyl trimethoxy silane having an average molecular weight of 400–600 (assume 500), commercially available from Petrarch Systems Inc., Bristol, Pa, as "(N-Trimethoxysilylpropyl)-Polyethylenimine PS076". The mixture is stirred at room temperature (about 25° C.) for about 1 hr. 10 min. and then allowed to stand overnight (about 17 hours) without stirring. Stirring is again initiated for another 5 hr. 40 min. at room temperature and again the mixture is allowed to stand overnight. The mixture is next filtered over a medium fritted glass filter. The filtrate is washed with 50 ml toluene twice and with 50 ml methanol twice to ensure removal of any excess silane reactant and then oven dried at 80°–85° C. for about 3 hr. 30 min. to yield about 12 grams of the covalently bound PEI-silica gel product; about 3.9% N.

B. The procedure of Example I-A is repeated except that 1 ml water is added to the silica gel/silane mixture. The yield of the PEI bonded silica gel product is about 13.3 grams; about 5.5% N.

EXAMPLE 2

A slurry of 20 grams silica gel with average particle diameter of 5.25 microns and average pore size of 330 Angstroms, commercially available from The Sep A Ra Tions Group, Hesperia, Calif. as a spherical silica under the trademark "Vydac A", Catalog No. 101T9B5, in 100 ml toluene and 2 ml water is prepared and stirred for 10 minutes at room temperature. To this is added with stirring 39.4 grams of a 50% w/w isopropanolic solution of polyethyleniminopropyl trimethoxy silane having an average molecular weight of 500 and the mixture is stirred for an additional 5 minutes. The mixture is then allowed to stand overnight at room temperature. The mixture is next filtered using a 1.0 microni filter funnel. The filtrate is washed with 50 ml toluene twice and 50 ml methanol twice, then air dried on the funnel and finally oven dried at 80°–85° C. for 3 hr. 30 min. to yield the PEI bonded silica gel product; about 2.85% N.

EXAMPLE 3

A slurry of 20 grams of 230–400 mesh (ASTM) silica gel having an average particle diameter of 40–63 microns and an average pore size of 420 Angstroms, commercially available from E. Merck Reagents, Germany, under the brand name "Fractosil 500", in 50 ml methanol and 1 ml water is prepared and stirred for 5 minutes at room temperature. A separate solution of 11.2 grams of a 50% w/w isopropanolic solution of polyethyleniminopropyl trimethoxy silane having an average molecular weight of 1800 in 100 ml methanol is also prepared. The silane solution is then added to the silica gel slurry over 5 minutes with stirring. After addition is complete, stirring is discontinued and the mixture is allowed to stand at room temperature for 50 hours. The mixture is next filtered over medium sized sintered glass. The filtrate is washed with 3×50 ml methanol under vacuum and then oven dried at 80°–85° C. for about 4 hours to yield the PEI bound silica gel product; about 1.1% N.

EXAMPLE 4

The following reaction mixtures are prepared in accordance with the teachings of the preceding examples:

| Components | A | B | C |
| --- | --- | --- | --- |
| Silica gel (5 microns, 330 Angstroms) | 10 g | 10 g | 10 g |
| Isopropanol | 50 ml | 50 ml | 50 ml |
| Water | 0.5 ml | 0.25 ml | 0.1 ml |
| PEIPr—triMeO—silane (M.W. = 600) as 50% w/w i-PrOH soln. | 9.9 g | 4.95 g | 2 g |

Each reaction mixture is stirred for 5 minutes at room temperature and then allowed to stand without stirring for 41 hr. 30 min. Each mixture is filtered, washed once with 50 ml isopropanol and twice with 50 ml methanol. Each filtrate is oven dried at 80°–85° C. for about 3 hr. 12 min. to yield the respective PEI bound silica gel products; A: 1.2% N; B: 1.0% N; C: 0.9% N.

EXAMPLE 5

A. To a slurry of 10 grams silica gel with average particle diameter of 40 microns and average pore size of 50 Angstroms in 50 ml hexane is added 19.71 grams of a 50% w/w i-PrOH solution of PEIPr-triMeO-silane having an average molecular weight of 500. The mixture is stirred for 5 minutes at room temperature and then heated to reflux temperature for about 2 hours. The mixture is allowed to cool to room temperature, filtered and washed with 50 ml hexane twice and 50 ml methanol twice. The filtrate is then oven dried at 80°–85° for about 3 hours to yield the PEI bound silica gel product.

B. The procedure of Example 5-A is repeated except that an equal amount of controlled pore glass (125 microns, 240 Angstroms) is substituted for the silica gel used therein to yield the corresponding covalently bonded, non-crosslinked PEI-PrSi-CPG product.

EXAMPLE 6

The procedure of Example 2 is repeated except that 25 grams silica gel (5.25 microns; 330 Angstroms) in 125 ml toluene and 2.5 ml water is reacted with 50 grams of the 50% w/w i-PrOH solution of PEIPr-triMeO-silane (M.W. 500) to yield about 29.4 grams of the PEI bonded silica gel product. This product is then mixed with 125 ml toluene and 10 grams succinic anhydride and the mixture rotated in an 80° C. water bath for 2 hours. At the end of this time, 20 ml methanol is added and the mixture is filtered. The recovered succinoylated PEI bound silica gel product is successively washed with 1×50 toluene, 2×50 ml methanol and 1×50 ml ethyl ether. The product is then dried at about 80° C. for about 48 minutes. Titration of the product against 1N sodium hydroxide indicates a carboxyl milliequivalent of about 0.65 per gram of product.

EXAMPLE 7

A methanolic (25 ml) slurry of the product of Example 2 (3.6 grams) is pressure-packed into stainless steel columns 250×4.6 mm. and the packed columns are equilibrated by pumping through 0..025M potassium phosphate buffer, pH 6.8, at a flow rate of 1 ml/min. After equilibration, these (singular) columns are used for chromatographic analysis of a protein solution containing commercial grade cytochrome c, alpha$_1$-acid glycoprotein, ovalbumin, and beta-lactoglobulin. A 4-mg sample of the protein solution containing 1 mg of each protein is applied to the equilibrated column, and separation is achieved with a 20 min. linear gradient from 0.25 potassium phosphate, pH 6.8, to 0.5M potassium phosphate, pH 6.8, at a flow rate of 1 ml/min. The proteins chromatograph as sharp symmetrical peaks with retention times of about 2.8 min. for cytochrome c, 9.0 min. for alpha$_1$-acid glycoprotein, 9.7 min. for ovalbumin, and a doublet at 10.5 and 11.0 min. for beta-lactoglobulin. All of the 280 nm absorbing material of each protein analyzed separately are collected which permits quantitation by comparing its absorbance to known standards of that protein. Recovery is >95% for each protein.

It is to be understood that anionic protein solutions can be retained by the weakly basic type of columns herein described and can be separated by gradient elution by varying either the ionic strength or pH of the mobile phase.

EXAMPLE 8

A methanolic (25 ml) slurry of the succinoylated product of Example 6 (3.6 grams) is pressure-packed into stainless steel columns 250×4.6 mm and the packed columns are equilibrated by pumping through 0.010M potassium phosphate buffer, pH 6.0, at a flow rate of 1 mL/min. After equilibration, these (singular) columns are used for chromatographic analysis of a protein solution containing commercial grade ovalbumin, cytochrome c, hemoglobin and lysozyme. A 4-mg sample of the protein solution containing 1 mg of each protein is applied to the equilibrated column, and separation is achieved with a 20 min. linear gradient from 0.010M potassium phosphate, pH 6.0, to 0.750M potassium phosphate, pH 6.0 at a flow rate of 1 mL/min. The proteins chromatograph as sharp symmetrical peaks with retention times of about 3.0 min. for ovalbumin, 11.4 min. for hemoglobin, 13.5 min. for cytochrome c, and 18 min. for lysozyme. All of the 280 nm absorbing material of each protein analyzed separately are collected which permits quantitation by comparing its absorbance to known standards of that protein. Recovery is greater than 95% for each protein.

It is to be understood that cationic protein solutions can be retained by the weakly cationic type of columns herein described and can be separated by gradient elution by varying either the ionic strength or pH of the mobile phase.

I claim:

1. The covalently bound, non-crosslinked polyethylenimine reaction product of particulate silica gel having an average particle diameter of from about 3 to 70 microns and an average pore size of from about 50 to 1000 Angstrom units, or particulate controlled pore glass having an average particle diameter of from about 37 to about 177 microns and an average pore size of from about 40 to about 1000 Angstrom units, with polyethyleniminopropyl trimethoxy silane having an average molecular weight of from about 400 to about 1800, wherein the term non-crosslinked means that the imino and amino groups on adjacent covalently bound polyethylenimine moieties are not crosslinked, or reacted with a crosslinking agent, to form a polymeric layer.

2. The reaction product of claim 1 which is converted to a weakly acidic carboxylated product containing from about 0.3 to about 1.2 carboxyl milliequivalent per gram by reaction with a dibasic acid anhydride in an inert organic solvent.

3. The reaction product of claim 1 which is converted to a weakly acidic carboxylated product containing about 0.8 carboxyl milliequivalent per gram by reaction with succinic acid anhydride in an inert organic solvent.

4. A chromatographic column suitable for liquid chromatography packed with the carboxylated product of claim 2.

5. A covalently bound, non-crosslinked polyethylenimine chromatographic column packing consisting essentially of the reaction product of particulate silica gel having an average particle diameter of from about 3 to about 70 microns and an average pore size of from about 50 to about 1000 Angstrom units with polyethyleniminopropyl trimethoxy silane having an average molecular weight of from about 400 to about 1800, wherein the term non-crosslinked means that the imino and amino groups on adjacent covalently bound polyethylenimine moieties are not crosslinked, or reacted with a crosslinking agent, to form a polymeric layer.

6. The packing of claim 5 wherein the particulate silica gel has an average particle diameter of from about 5 to about 40 microns and an average pore size of from about 50 to about 330 Angstrom units and the polyethyleniminopropyl trimethoxy silane has an average molecular weight of from about 400 to about 600.

7. The packing of claim 5 wherein the particulate silica gel has an average particle diameter of about 40-62 microns and an average pore size of about 420 Angstrom units and the polyethyleniminopropyl trimethoxy silane has an average molecular weight of about 1000.

8. A chromatographic column suitable for liquid chromatography packed with covalently bound, non-crosslinked polyethylenimine reaction product of particulate silica gel having an average particle diameter of from about 3 to about 70 microns and an average pore size of from about 50 to about 1000 Angstrom units, or particulate controlled pore glass having an average particle diameter of from about 37 to about 177 microns and an average pore size of from about 40 to about 1000 Angstrom units, with polyethyleniminopropyl trimethoxy silane having an average molecular weight of from about 400 to about 1800, wherein the term non-crosslinked means that the imino and amino groups on adjacent covalently bound polyethylenimine moieties are not crosslinked, or reacted with a crosslinking agent, to form a polymeric layer.

9. A chromatographic column suitable for liquid chromatography packed with covalently bound, non-crosslinked polyethylenimine reaction product of particulate silica gel having an average particle diameter of from about 3 to about 70 microns and an average pore size of from about 50 to about 1000 Angstrom units with polyethyleniminopropyl trimethoxy silane having an average molecular weight of from about 400 to about 1800, wherein the term non-crosslinked means that the imino and amino groups on adjacent covalently bound polyethylenimine moieties are not crosslinked, or reacted with a crosslinking agent, to form a polymeric layer.

10. A chromatographic column suitable for liquid chromatography packed with covalently bound, non-crosslinked polyethylenimine reaction product of particulate silica gel having an average particle diameter of from about 5 to about 40 microns and an average pore size of from about 50 to about 300 Angstrom units with polyethyleniminopropyl trimethoxy silane having an average molecular weight of from about 400 to about 600, wherein the term non-crosslinked means that the imino and amino groups on adjacent covalently bound polyethylenimine moieties are not crosslinked, or reacted with a crosslinking agent, to form a polymeric layer.

11. A chromatographic column suitable for liquid chromatography packed with covalently bound, non-crosslinked polyethylenimine reaction product of particulate silica gel having an average particle diameter of about 40-62 microns and an average pore size of about 420 Angstrom units with polyethyleniminopropyl trimethoxy silane having an average molecular weight of about 1000, wherein the term non-crosslinked means that the imino and amino groups on adjacent covalently bound polyethylenimine moieties are not crosslinked, or reacted with a crosslinked agent, to form a polymeric layer.

* * * * *